United States Patent [19]
Phillips et al.

[11] 3,904,277
[45] Sept. 9, 1975

[54] OPTICAL HAND SCANNER OPTICAL ASSEMBLY

[75] Inventors: Richard R. Phillips, Stamford, Conn.; Robert G. Peterson, Cross River, N.Y.

[73] Assignee: Pitney-Bowes, Inc., Stamford, Conn.

[22] Filed: Mar. 20, 1974

[21] Appl. No.: 452,755

[52] U.S. Cl. .......... 350/252; 235/61.11 E; 250/227; 350/96 B; 350/175 SL

[51] Int. Cl.² .......... G02B 7/02

[58] Field of Search .......... 350/175 SL, 252, 96 B; 235/61.11 E; 401/216; 250/227

[56] References Cited

UNITED STATES PATENTS

| | | | |
|---|---|---|---|
| 2,536,124 | 1/1951 | Bolvin et al. | 401/216 |
| 3,145,249 | 8/1964 | Meltzer | 350/175 SL |
| 3,584,779 | 6/1971 | Kessler | 250/227 X |
| 3,784,794 | 1/1974 | Allais | 235/61.11 E |

FOREIGN PATENTS OR APPLICATIONS

| | | | |
|---|---|---|---|
| 613,408 | 11/1948 | United Kingdom | 401/216 |
| 945,809 | 12/1948 | France | 401/216 |
| 263,054 | 11/1949 | Switzerland | 401/216 |

OTHER PUBLICATIONS

Montedonico, I.B.M. Technical Disclosure Bulletin, Vol. 11, No. 12, May 1969, pp. 1761–1762.

*Primary Examiner*—Ronald L. Wibert
*Assistant Examiner*—F. L. Evans
*Attorney, Agent, or Firm*—William D. Soltow, Jr.; Albert W. Scribner; Peter Vrahotes

[57] ABSTRACT

This disclosure concerns a mounting assembly for a spherical lens in a light pen. The pen receives the spherical lens at one end thereof, where the lens is rotatably supported by a seat which minimizes friction therebetween. Proper contact is made between the the spherical lens and the wall of the light pen to achieve self cleaning of the lens.

12 Claims, 3 Drawing Figures

OPTICAL HAND SCANNER OPTICAL ASSEMBLY

BACKGROUND OF THE INVENTION

Many encoding systems have been proposed which are adapted to be used at checkout stands wherein an optical hand scanner such as a light pen, or wand, is utilized in the reading of digitally encoded record members such as labels, tickets, tapes and the like. These sensing systems may be used in department stores, supermarkets, hardware stores or other retail outlets. Such hand held light, or optical, pens provide fast checkout and the ability to read labels on oddly-shaped packages.

One advantageous form of a light pen is one that utilizes a rotating sphere at the end thereof as the lens. This particular design is advantageous because the rotating sphere minimizes friction to enhance movement of the pen when in contact with a label and renders the optics of the light pen much simpler, more reliable and durable. One problem associated with such light pens, as well as with other types of light pens which make contact with a label, is that a buildup of contaminants occurs on the tip due to contact with the label being read. This buildup is due to the fact that contaminants such as wax, clay, fibers and the like are normally found on the surface of encoded record members. Although the buildup on the pen tips tends to hinder the optics in a hand held pen, with a rotating sphere such a buildup has an added disadvantage in that the contaminants inhibit the rotation of the sphere and in time will prevent such rotation.

SUMMARY OF THE INVENTION

A structure for a light pen having a rotating, spherical lens has been devised wherein a self cleaning action is provided for the rotating lens. This is accomplished by achieving proper contact between the rotating spherical lens and the housing of the pen in such a manner that the housing acts as a "windshield wiper" to the lens as it continually cleans the surface thereof during rotation. Additionally, the spherical lens is seated within an assembly which enhances and promotes rotation of the sphere.

BRIEF DESCRIPTION OF THE DRAWING

In the drawing two embodiments of the invention are shown wherein like parts have like numerals.

DESCRIPTION OF THE PREFERRED EMBODIMENT

Figure 1:
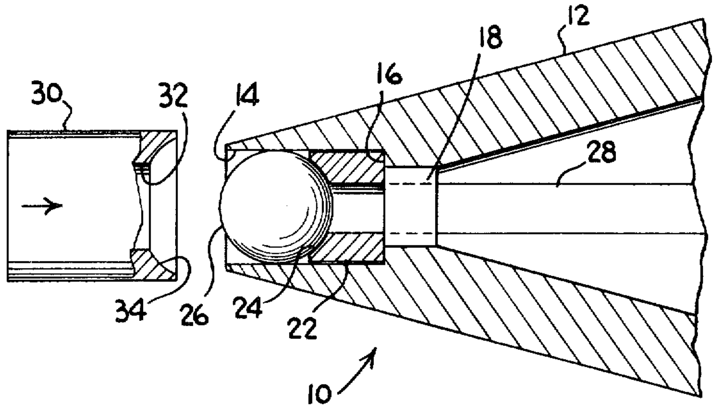
FIG. 1 is a cross-sectional, longitudinal view of a heater and one end of a light pen which incorporates the features of this invention, before the spherical lens is secured.
Figure 2:
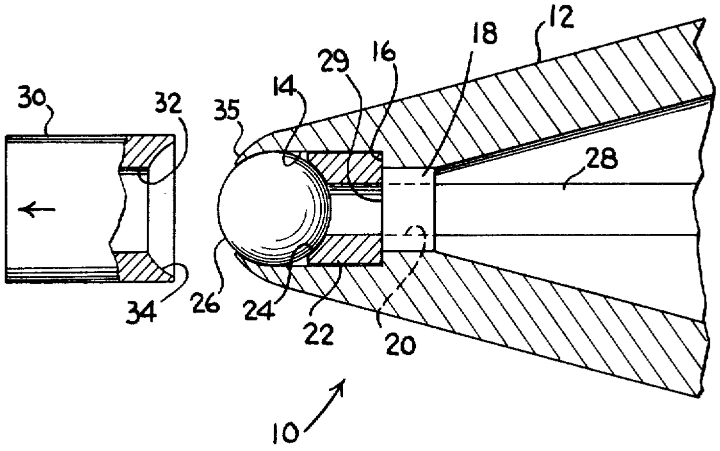
FIG. 2 is a cross-sectional view similar to FIG. 1 showing the light pen after the spherical lens has been secured.

Referring now to FIGS. 1 and 2 of the drawing, the tip end of an optical light pen is shown generally at 10 in the form of an apex and includes a portion of an annular housing 12 having a central opening 14 therein. The opening 14 has a shoulder 16 and a ring member 18 is received within the reduced area of the opening. The ring 18 in turn has an axial opening 20 therein. An annular seal 22 is received within the opening 14 and abuts the shoulder 16. The seat 22 has a curved portion 24 at one end thereof. A spherical lens 26 is received within the opening 14 and engages the annular seat 22, the curvature of the curved portion 24 being generally matched to the curvature of the spherical lens. It is not a requirement that the curvatures of radius of the annular seal 22 and the spherical lens be identical, it only being necessary that sufficient support is provided by the seat.

Preferably the spherical lens is made of sapphire but other hard, transparent materials may be used such as ruby. An optical fiber bundle 28 is received within the opening 20 of the ring member 18, the end 29 of the optical fiber bundle being spaced relative to the spherical lens 26. The optical fiber bundle 28 provides means for directing light through the lens 26 and means for receiving and sensing light entering the pen 10 through the lens.

As shown in FIGS. 1 and 2, a heating element 30 is shown in a position spaced relative to the light pen 10. The heater 30 has an opening 32 therein and a portion of the heater wall at the end thereof forms a curved configuration 34. The heater 30 is so designed that it receives the end of the light pen 10, which preferably is made of plastic. The heater 30 is operative to obtain a temperature at or slightly above that which is required to achieve permanent deformation of the material of the housing 12. Due to the heat of the heater 30 upon insertion into the opening 32 and contact with the curved portion 34, the tip of the light pen forms a curved portion 35 about the spherical lens as shown in FIG. 2. This is accomplished in such a way that the spherical lens 26 is firmly held between the curved portion 35 and the seat 22 to provide positive contact with the housing 12 while allowing rotation. Through such contact, any contaminants on the surface of the sphere 26, is removed in a manner similar to the action of a windshield wiper. When the housing 12 is made of a metal, the element 30 need not be heated and the curved portion can be physically formed to the contour of the sphere 26.

The cooperation of the shoulder 16 with the seat 22 is an important consideration. It will be appreciated that stress will be applied to the seat 22 as a result of the spherical lens 26, contacting a label. Measures should be taken so there is no deformation of the seat that would cause the positive contact between the spherical lens 26 and the curve portion 35 to be affected in a detrimental manner. In order to prevent such deformation, materials with adequate mechanical and physical properties should be used and the contact surface between the annular seat 22 and the shoulder 16 should be large but consistent with the need to provide an opening 18 for the passage of light. It will be appreciated that the annular seat 22 may be an integral part of the housing 12 if desired.

Figure 3:
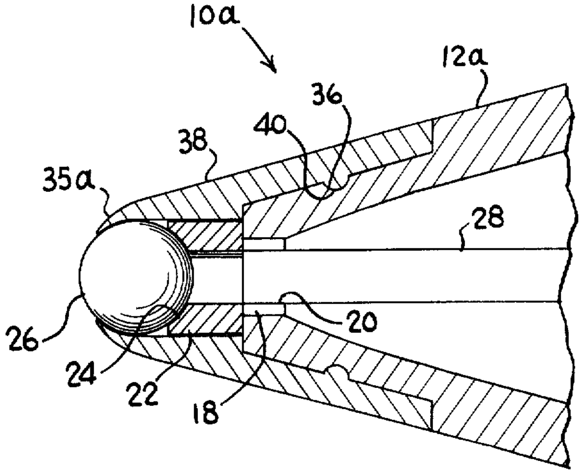
FIG. 3 is a cross-sectional elevational view of one end of a light pen incorporating an alternate embodiment of the invention.

An alternate embodiment of the light pen 10*a* is shown in FIG. 3. In this member the tip 10*a* is made of two pieces. The housing 12*a* has a circumferential groove 36 therein. A sleeve 38 having an internal rib 40 is adapted to snap over the housing 12a and to be held thereon. The sleeve 38 has a pre-formed curved portion 35*a* which is shaped to the contour of the spherical lens 26. Through the cooperation of the seat 22 with the curved portion 35*a* of the sleeve 38, the spherical lens 26 is not only held firmly in place but the fit is of such a close tolerance that the surface of the spherical lens 26 is continually cleaned by the rotating action during scanning. As the curved portion 35*a* engages the surface of the rotating sphere 26, any contaminates which are deposited on the surface tends to be carried to the sleeve 38, and removed thereby. In this way, the optical properties of the spherical lens are not only protected, but the ability of the sphere to continually rotate is assured.

Another important feature of the construction of the light pen 10 is in the choice of materials of the annular seat 22. Preferably, the material of the annular seat 22 will be the same material as the spherical lens, as for example, sapphire or ruby. Alternately the annular seat 22 may be made from a low friction material such as metal impregnated and/or coated with polytetrofluoroethylene (PTFE). The important consideration is that the seat 22 be made of a long wearing material which has low static and dynamic coefficiency of friction in combination with the spherical lens. This is also a consideration with regard to the materials from which the housing 12 is made at the area of contact (the curved portion 35) with the spherical lens 26. The use of some materials would allow the housing 12, partially at the area of contact, and the annular seat 22 to be made of the same material. For example, the housing 12 and/or the annular seat 22 may be made of aluminum which is anodized to form aluminum oxide. The $Al_2O_3$ is impregnated with PTFE to not only impregnate the parts, but to provide a coating as well. Another way of providing a satisfactory annular seat 22 and/or housing 12 is to fabricate the same from a platable material such as aluminum, iron, copper, and alloys of the same. The materials are then plated with a solid solution of nickel-phosphorus by the electroless process. These two examples illustrate methods for achieving hard surfaces having low static and dynamic coefficients of friction.

What is claimed is:

1. An optical light pen for use in the reading of an encoded record member, the combination comprising:

A. a housing having a longitudinally extending opening and an apex at one end thereof;

B. an annular seat member received within said opening and secured within said housing:

C. a ring member securely received within said housing coaxially with and adjacent said annular seat member;

D. a spherical transparent lens rotatably received within said opening at the apex and supported by said seat member;

E. the apex of the housing having a curvilinear portion which engages the spherical lens to firmly hold the spherical lens against itself and against said annular seat;

F. a first fiber optics bundle received within the opening of said ring member and extending longitudinally within said housing for conveying light from said housing through said lens; and G. a second fiber optics bundle received within the opening of said ring member and extending longitudinally within said housing for receiving said sensing light passing through said lens into said housing.

2. The light pen of claim 1 wherein the material of said seat is the same material as the spherical lens.

3. The light pen of claim 1 wherein said annular seat is made of aluminum oxide impregnated with polytetrafluoroethylene.

4. The light pen of claim 1 wherein said spherical lens is selected from the group consisting of sapphire and ruby and said seat is composed of polytetrafluoroethylene.

5. The light pen of claim 1 wherein said seat is made of a platable material having a nickel-phosphorus coating thereon.

6. The light pen of claim 1 wherein said annular seat is integral with said housing.

7. An optical light pen for use in the reading of an encoded record member, the combination comprising:

A. a generally longitudinally extending housing having an opening at one end thereof;

B. an apex member having an opening therein secured to said housing with the opening of the housing being confluent with the apex member opening;

C. an annular seat member received within said opening and secured within said apex member;

D. a ring member securely received within said housing coaxially with and adjacent said annular seat member;

E. a spherical, transparent lens rotatably received with said apex member opening and supported by said seat member;

F. the end of the apex opposite said housing having a curvilinear configuration which engages the spherical lens to firmly hold the spherical lens against said seat;

G. a first fiber optics bundle received within the opening of said ring member and extending longitudinally within said housing for conveying light from said housing through said lens; and H. a second fiber optics bundle received within the opening of said ring member and extending longitudinally within said housing for receiving and sensing light passing through said lens into said housing.

8. The light pen of claim 7 wherein the material of said seat is the same material as the spherical lens.

9. The light pen of claim 7 wherein said annular seat is made of aluminum oxide impregnated with polytetrafluoroethylene.

10. The light pen of claim 7 wherein said spherical lens is selected from the group consisting of sapphire and ruby and said seat is composed of polytetrafluoroethylene.

11. The light pen of claim 7 wherein said seat is made of a platable material having a nickel-phosphorus coating thereon.

12. The light pen of claim 7 wherein said annular seat is integral with said housing.

* * * * *